United States Patent
Knaapi et al.

(10) Patent No.: US 6,222,543 B1
(45) Date of Patent: Apr. 24, 2001

(54) METHOD FOR ORGANIZING AND PRESENTING VISUAL INFORMATION ON A COMPUTER SCREEN

(76) Inventors: Matti Knaapi, Rauhankatu 7 E 38, FIN-00120 Helsinki; Kari Saaren-Seppälä, Pietarinkatu 19 A, FIN-00140 Helsinki; Kalle Vuoristo, Vellamonkatu 29 A 10, FIN-00550 Helsinki, all of (FI)

( * ) Notice: Subject to any disclaimer, the term of this patent is extended or adjusted under 35 U.S.C. 154(b) by 0 days.

(21) Appl. No.: 08/714,582

(22) Filed: Sep. 16, 1996

(30) Foreign Application Priority Data

Sep. 15, 1995 (FI) ........................................... 954341

(51) Int. Cl.⁷ ...................................................... G06F 15/63
(52) U.S. Cl. .................................................................. 345/347
(58) Field of Search ..................................... 707/517, 518, 707/522, 526, 530; 345/347, 116, 339

(56) References Cited

U.S. PATENT DOCUMENTS 4,755,955 * 7/1988 Kimura et al. ...................... 364/518
5,119,476 * 6/1992 Texier ................................. 395/157

* cited by examiner

*Primary Examiner*—Hosain T. Alam
*Assistant Examiner*—Alford W. Kindred
(74) *Attorney, Agent, or Firm*—Steinberg & Raskin, P.C.

(57) ABSTRACT

This invention introduces a method for organizing information to be presented on a computer display automatically into an esthetically satisfying and functionally feasible display unit. The information is presented in the form of modules and the design and minimum size of each module is determined unambiguously on the basis of the module's elements and parameters including fonts, margins etc. The modules are formed automatically with the invented computer program. The invention also allows the modules to be combined into groups, which automatically assume a rectangular shape and an aesthetically uniform design. If necessary, the modules expand to cover any unused space. This method allows displays to be formed without aesthetic design work, with the additional advantage of providing a single instrument for creating all types of displays. The invention also offers an excellent tool for producing object-oriented data processing displays.

19 Claims, 4 Drawing Sheets

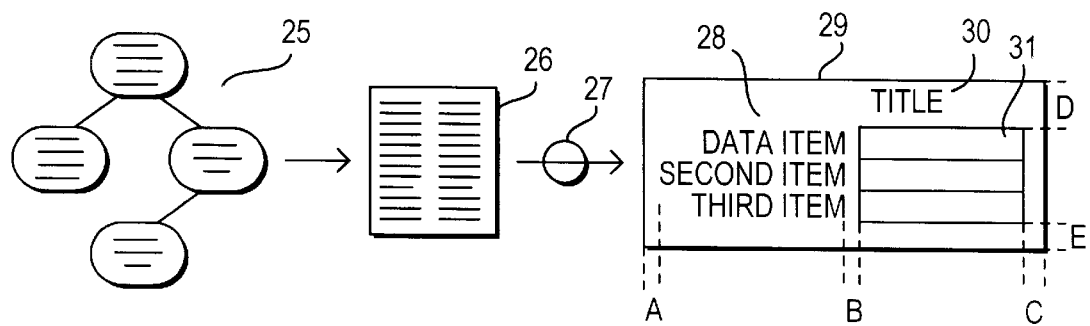
FIG. 3
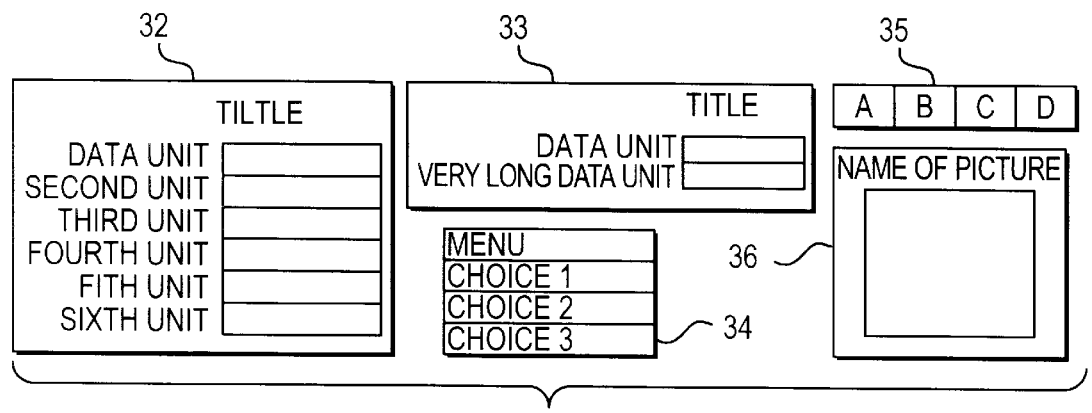
FIG. 4a
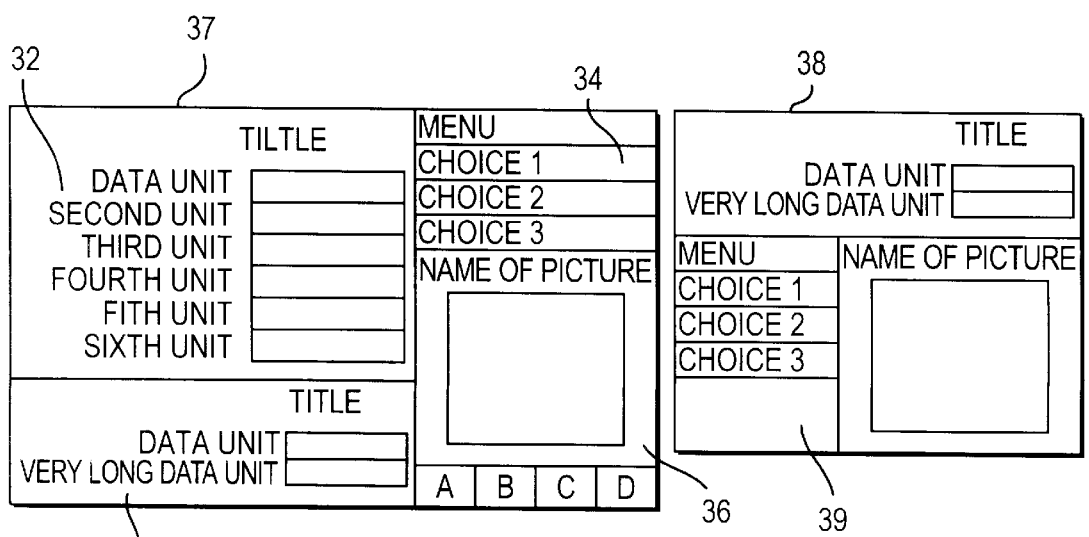
FIG. 4b
FIG. 4c

METHOD FOR ORGANIZING AND PRESENTING VISUAL INFORMATION ON A COMPUTER SCREEN

FIELD OF THE INVENTION

This invention introduces a method for organizing information to be presented on a computer display.

BACKGROUND OF THE INVENTION

A suitable computer has a graphic user interface and a tool for choosing and moving the objects on the screen such as a mouse. An ordinary PC is such a computer.

Conventional computer applications are usually built with software such as Visual Basic, Access, Paradox, Visual C++ and Delphi. Data is presented in windows that can be opened and closed and which include a background and a number of visual elements presented against the background.

In designing such windows, one of the above conventional software is used wherein an empty window is opened and the necessary visual elements are chosen one at a time from a tool palette. The elements are then moved to suitable places on the screen and given a suitable size. Another alternative is to choose an existing window as the basis, remove unnecessary elements and add the desired new elements. The elements can be moved from place to place within the window. All of the foregoing is accomplished manually using a mouse, for instance. Each element is given a permanent place in the window such that the window is a complete, permanent unit, in which only the values of the data can be changed. Titles and identifiers are usually placed in the upper left portion of the window while other elements are situated on various sides of the window.

SUMMARY OF THE INVENTION

Many disadvantages are encountered in utilizing the prior art methods discussed above. One such disadvantage is that the windows must be designed separately and set up manually in front of a screen. Thus, in a large system with hundreds or thousands of screens, a tremendous amount of work is required. Another disadvantage is that the displays are seldom clearly arranged and are never uniform since they are created by a number of different people. The prior art methods also restrict the flexibility of the windows. In working situations, different users need different data combinations. In order to improve efficiency, users may also wish to change the places of some elements on the screen. It is, however, laborious to satisfy these needs using existing methods.

Various efforts have been made to solve these problems. Software has been developed wherein the contents of a window are chosen from the description of a database and a window is generated to fit the model. The window is then developed further manually. However, these efforts have merely alleviated the problems involved.

The present invention solves the aforementioned problems by automatically arranging visual information into aesthetically satisfying and functionally feasible display units. The data to be presented includes various items such as words, texts, figures, character strings, symbols and pictures, and various elements used for control functions, such as buttons and menus. The present invention deals with organizing these simple elements into groups and their smooth processing.

More specifically, the present invention provides a method for organizing and presenting visual information by constructing a window with modules made up of a set of interrelated visual elements such as data, buttons, selection tools etc. The design and minimum size of each module is unambiguously determined by the elements and parameters which are used to define the font size, line spacing, margins, etc. Each module is formed automatically when its elements, mode of presentation and common module parameters have been chosen. The modules are formed in a rectangular shape and can be combined with one or more other modules automatically to form groups of modules with aesthetically satisfying dimensions.

The method of the present invention has the advantage of saving the information system designer the trouble of designing the display. He merely defines the modules and their data contents with module definitions. The information system defines the modules which are required for each purpose as well as which modules are compulsory and which are optional. Thus, all displays are available and their design is defined on the basis of the module definition, the selected mode of presentation, and parameters. It is estimated that a third of all information system work is accounted for by displays and layout design in particular, making it easy to understand the importance of automatic aesthetically satisfying displays.

Another advantage presented by the present invention is that the method allows information system users to modify displays in any way they like by changing the places of the modules in module groups, splitting and combining module groups as far as module connections allow, and by closing unnecessary modules while the computer arranges all modules and module groups into aesthetically uniform arrangements. The user may also save these module groups for future use. Thus, the user can choose the modules that are the most suitable for his work and in the most suitable order.

The method according to the present invention also offers the advantage of making all information systems uniform both in design and use. This is of great importance to companies with a number of different information systems. Creating systems displays having uniform styles and functions makes it easy for people to learn using different systems. In addition, the need for training is reduced and it is easier to move from task to task. The present invention also offers a useful instrument for object-oriented data processing. When module definitions are treated as objects shown on the screen as modules, the data in the modules can be manipulated by interactive placement of modules. For example, modules can be combined to present similarly defined data together. Such use is easy to understand and it is easy for the user to access various data combinations. In accordance with a first embodiment of the present invention the module group is automatically given a rectangular shape. In order to turn a group of modules of varying sizes into a rectangle, the individual modules expand to fill empty space within the module group wherever necessary.

In addition, in accordance with a second embodiment of the present invention, the user can choose various modes of presentation for each individual module. A data content is presented in the form of a concise list or a more comprehensive table. The module can also be reduced to a mere title releasing space for other uses. The user is free to change the mode of presentation whenever he likes. He can, for instance, use a mouse to choose the desired mode in a pop-up menu. When the user changes the mode of presentation, a newly shaped module takes its place among the other modules, moving them so that the group automatically resumes an aesthetically pleasing design.

In accordance with a third embodiment of the present invention, the computer assists the user in creating the module design. After the modules for a group have been chosen, the computer may, for instance, compute the optimum spatial layout for the modules under certain conditions, such as placing the identifier module in the top left corner, and then suggest this arrangement to the user. The user can either approve the suggested arrangement or make necessary adjustments to it. This method makes the formation of module groups automatic such that, under normal conditions, no one need plan aesthetically pleasing display designs. The computer may also be asked to show the minimum module sizes in a group and empty regions, making manual adjustments to the group easier in terms of space.

In addition, in accordance with a fourth embodiment of the present invention, the modules of a group and their elements are aligned horizontally and/or vertically so that they form an aesthetically pleasing layout. For instance, the text lines of adjacent modules, the top and bottom edges of pictures and/or data fields, or the left and right edges of the data fields in successive modules may be aligned. This is the case, in particular, where they would otherwise be fairly near each other or where it is desired that the differences in length be concealed.

In accordance with a fifth embodiment of the present invention a relationship between two individual modules is expressed by a design on the border of such modules, e.g., a symbol placed on the border. Such a feature provides user-friendly object-oriented data processing.

In accordance with a sixth embodiment of the present invention a method is provided wherein the characteristics of an individual module is illustrated with a certain background color or parameter. For example, a common background color may be used to show which modules work together in performing a certain task.

The application of this invention is not, however, limited to the embodiments listed above and illustrated in the figures below. For example, the individual modules and module groups having a basic rectangular shape can be shown on the screen in a modified form such as a rhombus, parallelogram or central projection, or other mathematical function. This will allow modules and module groups to be shown in three-dimensional space, e.g. on the walls of a room or on curved surfaces.

Other advantages and characteristic features of the invention will be apparent from the detailed description of the invention.

BRIEF DESCRIPTION OF THE DRAWINGS

FIG. 3 shows the method for forming modules.

FIG. 4 shows how the modules are combined into a group.

DETAILED DESCRIPTION OF THE INVENTION

Figures 1, 2:
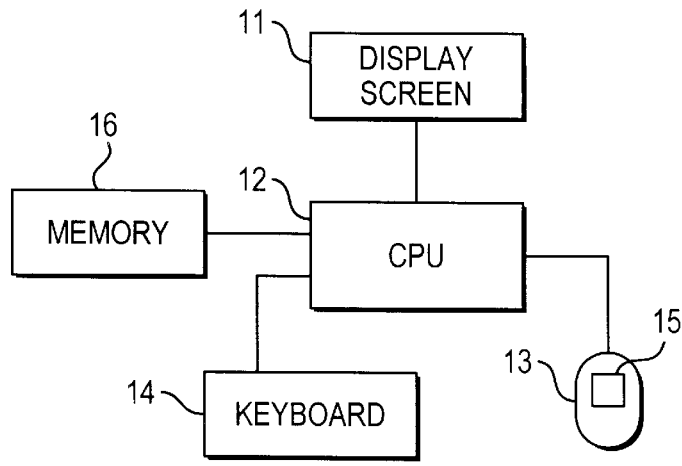
FIG. 1 shows a suitable hardware configuration for the invention.
FIG. 2 shows a prior art design display.

FIG. 1 shows a hardware configuration suitable for the present invention. A display screen 11 is controlled by a CPU 12, which the user operates with a mouse 13 and a keyboard 14. The mouse is used to move a cursor on the display screen and to select the desired object on the screen. The mouse has a button 15 which, by clicking, allows various functions to be carried out with a selected object. For example, an object on the screen can be dragged across the screen by clicking on the object. The configuration also comprises a memory 16 which contains the data required by the information system to be designed and the program the invention requires to construct displays for presenting this data. An ordinary PC is a typical example of such a configuration.

FIG. 2 shows the principle of designing displays using a prior art display design program. A screen 18 contains the display to be designed in a window 19 consisting of a background 20 and various other elements 21. The window is designed by choosing suitable elements from the tool kit 22 available in the display design program and moving them to suitable places on the background, while, at the same time, adjusting the dimensioning. This process is carried out manually making the production of aesthetically pleasing windows a laborious job. Furthermore, this process must be done separately with each individual window. Moreover, when a window design is complete, it is difficult to change. Elements which are not required for specific tasks are difficult to remove or to transfer to other windows.

FIG. 3 shows the method according to the present invention for forming modules. In accordance with the present invention, no drafting is required for the design of the modules because they are produced automatically and unambiguously using the module's elements and parameters defining background colors, fonts and font sizes, line spacing, margins, etc. For example, the design of data-module 29 is determined using module definition 26 as required by the information system's object model or data model 25. As illustrated in this example, the content of the titles and data, and the lengths of the corresponding data fields, are defined. Using this module definition, module 29 is created on the screen such that the various elements always have a standard place and the margins and font sizes are determined using parameters common to all modules of the same series. Such parameters can be at least partly changed.

A typical data module 29 comprises a title 30, the names of the data items 28 situated under one another and the corresponding data fields 31. The width of the module is determined by the longest data item and the longest data field and margins a, b and c. The height of the module is determined by the number of data items under one another, the line height and margins d and e. The title of the module has a certain place in relation to the data fields. Accordingly, the contents and sizes of other modules are determined using the same method.

After the modules which are required by the information system have been defined, they can be displayed on the screen and combined into various groups. For example, data modules 32 and 33 in FIG. 4a, module 34 containing the menu, module 35 containing buttons and module 36 containing a figure can be combined into module group 37 as shown in FIG. 4b, module group 38 as shown in FIG. 4c or in some other group. It can be seen in module group 37 in FIG. 4b how the length of the menu module 34 has increased and the right margin of picture module 36 has grown in order to give the module group 37 an overall rectangular shape. In addition, successive modules 32 and 33 have been arranged such that the left and right edges of the essential data fields align. The left margin of module 32 and the data fields of module 33 have slightly increased, while the rows of adjacent modules 32,33 have been aligned horizontally. Only three modules have been chosen for module group 38 as shown in FIG. 4c. An additional region 39 has appeared at the bottom edge of the module containing the menu in order to give the module group a rectangular shape.

A number of different methods can be used for constructing module groups and for changing the internal order of modules in an existing group. One such method is shown in FIG. 5, with modules forming columns. Either vertical columns or horizontal rows are chosen for the group.

In either case the arrangement of the modules can be controlled as follows: The modules have been marked A, B, C and D, and their minimum sizes have been presented in FIG. 5a. Each module has been divided into five regions, e.g. module A comprises regions 1, 2, 3, 4 and 5.

Figure 5A:
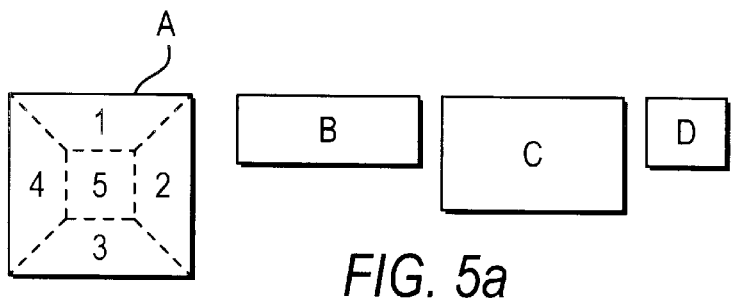
FIG. 5 shows one way of moving and grouping the modules.
Figure 5B:
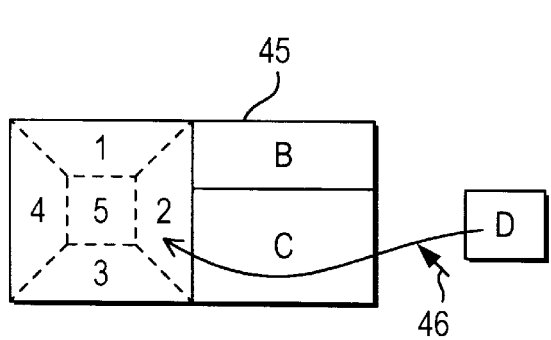

In order to combine two individual modules, a first module is moved by placing a cursor (element 46 as shown in FIG. 5b) on top of the module to be moved and clicking the mouse button to drag the module. The cursor is then moved to one of the numbered regions in a second module and the button is released. The first module remains grouped with the second module and is automatically placed on the side of the module next to the numbered region.

Figure 5C:
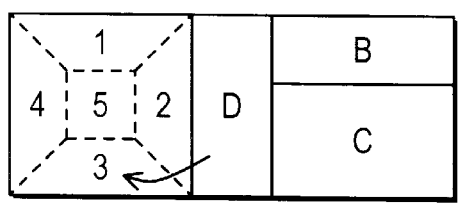
Figure 5D:
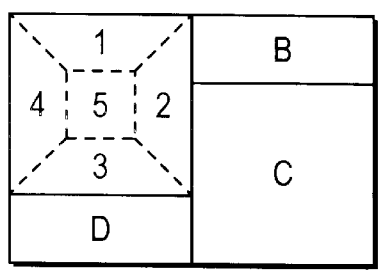
Figure 5E:
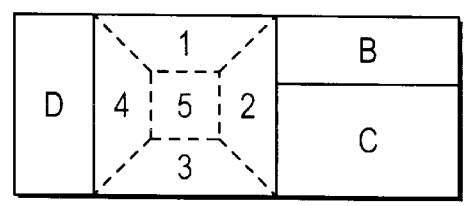

By using vertical columns, modules A, B and C can be made to form group 45 as shown in FIG. 5b. If one wishes to add module D to the module group in FIG. 5b, module D is dragged with the cursor to region 2 of module A, in which case module D is moved to module A's right-hand side into a new column and the computer adjusts the module sizes so that a rectangular group of modules is created as shown in FIG. 5c. To move module D under module A, module D is dragged to region 3 forming the module group as shown in FIG. 5d. Region 5 is used to make the modules change places. If module D in FIG. 5c is moved to region A5, modules D and A change places, and a grouping shown in FIG. 5e is achieved. It is possible to activate and process entire groups of modules in the same manner.

In accordance with the present invention, all modules can, within the framework of their dependency relations, be opened freely and can be moved within and between groups and closed. In addition, a module group can be frozen, keeping its internal order unchanged, and the module group behaves like an individual module in relation to other individual modules or module groups.

Figure 6A:
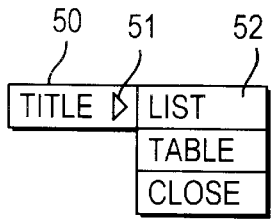
FIG. 6 shows an example of the various modes of presentation of a module.
Figure 6B:
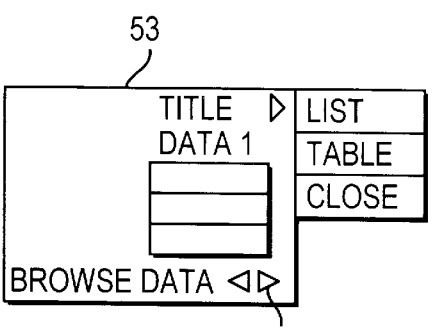
Figure 6C:
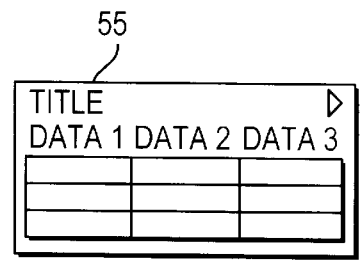

In another embodiment of the present invention, the user is able to form a number of different modes of presentation with a single module definition. For example, FIG. 6 shows three different modes of presentation for an object's data. FIG. 6a shows module 50 including a title and an arrow shaped button 51 on the right-hand side of the module. Button 51 opens menu 52, allowing the user to choose another mode of presentation or close the entire module. If a list mode is chosen, the process produces module 53 (FIG. 6b) in which the data of a single object is shown in list form. Module 53 also contains buttons 54 which can be used to browse corresponding data of other objects. If a table mode is chosen from menu 52, the process produces module 55 as illustrated in FIG. 6c showing corresponding data for three objects. The various modes of presentation corresponding to the various purposes are produced automatically in each case by the relevant module definitions. If the item to be presented is a symbol or picture, it can be shown in a larger or smaller size while if buttons are used they can be shown in vertical columns, horizontal bars, etc. Generally, modules can also be presented in title form in order to allow easy access to other modes of presentation.

In another embodiment of the present invention, a suitable instrument for object-oriented data processing is provided as illustrated in FIG. 7. In this embodiment, the interactive features of individual modules can be activated simply by moving them next to each other or into the same module group. As illustrated in FIG. 7, two objects, a customer and an invoice, are each shown in corresponding modules 56 and 57, respectively. The customer module allows the user to browse customers and choose those whose data the user is interested in. When the invoice module 57 is moved adjacent to the customer module 56, a symbol 58 appears along the border, indicating interaction between the two modules.

Figure 7A:
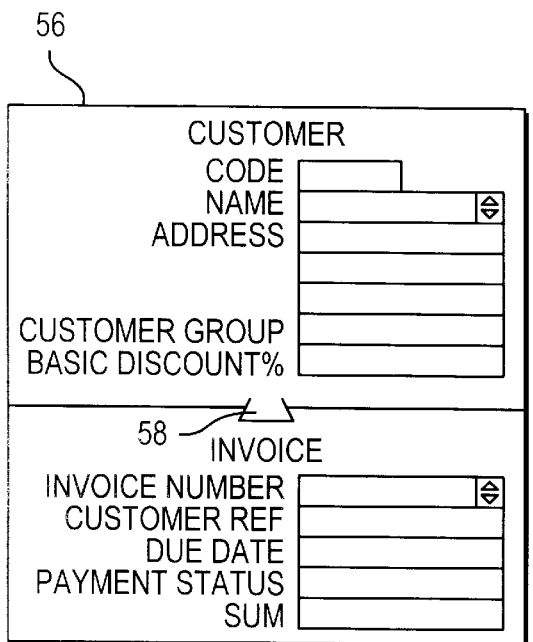
FIG. 7 shows how the present invention can be applied to object-oriented data processing.

When symbol 58 is in the form as shown in FIG. 7a, such that part of customer module 56 appears to be on top of invoice module 57, the customer is the dominant object. Customers can be browsed and chosen freely such that invoice module 57 shows only the invoices of the chosen customer.

Figure 7B:
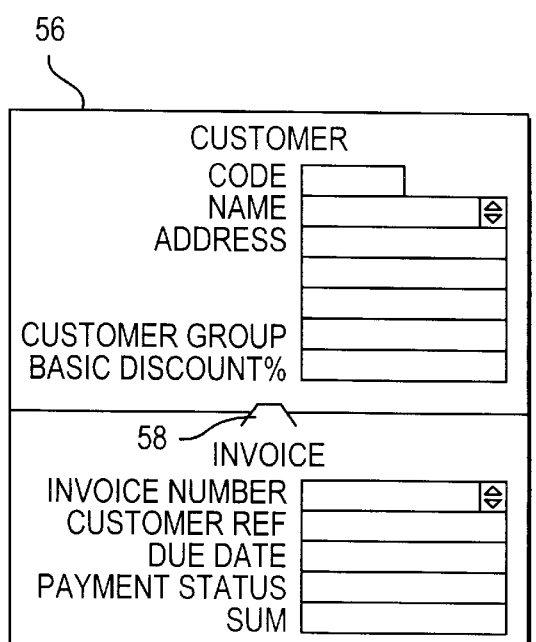

This direction of dominance can be reversed whereby symbol 58 is changed as shown in FIG. 7b and the invoices can be freely browsed and chosen. When a certain invoice is chosen, the customer is shown on customer module 56. It is also possible for the shape of symbol 58 to express the relation of the objects. As shown in FIG. 7b, for example, the fact that the narrower part of the key points towards the customer shows a one-to-many relationship.

The examples provided above are not meant to be exclusive. Many other variations of the present invention would be obvious to those skilled in the art, and are contemplated to be within the scope of the appended claims.

What is claimed is:

1. A system for organization and presentation of visual information on a computer display screen, comprising:
    a display screen,
    a control device for graphic user interface, and
    means for forming a plurality of rectangular modules on said display screen using said control device, each module comprising various visual elements such as data, function buttons, selection tools or other such items, said generating means being structured and arranged to automatically form said modules to each have a minimum size depending on the elements and the parameters used to define the elements.

2. The system according to claim 1, wherein said individual modules of said module group expand to fill empty space within said module group.

3. The system according to claim 1, wherein said individual module comprises a variety of possible modes of presentation.

4. The system according to claim 1, wherein said individual modules of said module group and the elements of said individual modules of said module group are aligned horizontally and vertically.

5. The system according to claim 1, wherein the means for generating suggests a spatially feasible order for said individual modules of said module group.

6. The system according to claim 1, wherein a relation between two said individual modules of said module group is expressed with a symbol situated on the border of said individual modules.

7. The system according to claim 1, wherein said individual module comprises a background color such that said background color indicates a feature of said individual module.

8. A method for organizing and presenting visual information on a computer display screen in a uniform manner, comprising the steps of:

defining a set of common parameters for displaying the visual information;

choosing data including one or more visual elements and modes of presentation and the common parameters for said visual information for a plurality of individual modules;

converting said data into a module definition for each of the plurality of modules; and then forming a respective individual module from each module definition such that each individual module is a rectangular unit of a minimum size.

9. The method according to claim 8, further comprising the step of placing two or more said individual modules adjacent to one another to form a module group wherein the outer border of said module group forms a rectangle.

10. The method according to claim 9, further comprising the step of expanding said individual modules of said module group to fill empty space within the module group.

11. The method according to claim 9, wherein the placing step further includes the step of aligning said adjacent individual modules of said module group and the elements of said adjacent individual modules horizontally and vertically.

12. The method according to claim 9, further comprising the step of expressing a relationship between two said adjacent individual modules by a symbol situated on the border of said adjacent individual modules.

13. The method according to claim 9, further comprising the step of freezing said module group such that the location of said individual modules within said module group remains constant and said module group behaves as an individual module in relation to other modules.

14. The method according to claim 9, further comprising the step of suggesting an optimum spacial layout of said individual modules in said module group.

15. The method according to claim 8, further comprising the step of presenting the individual module in various modes.

16. The method according to claim 8, wherein the forming step includes the step of forming the respective individual module with a background color indicative of a feature of said individual module.

17. The method according to claim 8, wherein the choosing step includes choosing one or more visual elements including data, function buttons and selection tools.

18. The method according to claim 8, wherein the choosing step includes choosing common parameters for defining font size, line spacing and margins.

19. A method for organizing and presenting visual information including data, function buttons and selection tools on a computer screen using a control device for graphic user interfaces, comprising the steps of:

defining a set of common parameters including font, line spacing and margins for displaying the visual information;

choosing data including one or more elements and modes of presentation, and the common parameters for said visual information, for a plurality of individual modules;

converting said data into a module definition for each of the plurality of modules; and then automatically forming a respective individual module from each module definition such that said individual module is a rectangular unit of minimum size which can be handled separately or grouped together with one or more individual modules adjacent to one another to form a module group having a border situated between each said adjacent individual module and wherein said module group is handled as a single unit.

* * * * *